US006332959B1

(12) United States Patent
Hoffmann et al.

(10) Patent No.: US 6,332,959 B1
(45) Date of Patent: Dec. 25, 2001

(54) METHOD AND DEVICE FOR PRODUCING A CONTROLLED ATMOSPHERE WITH LOW OXYGEN PARTIAL PRESSURE

(75) Inventors: Michael Hoffmann, Ranco (IT); Marc Steen, Bergen; Victor Harrison, Alkmaar, both of (NL); Robert Danzer, Graz (AT)

(73) Assignee: European Atomic Energy Community (LU)

( * ) Notice: Subject to any disclaimer, the term of this patent is extended or adjusted under 35 U.S.C. 154(b) by 0 days.

(21) Appl. No.: 09/462,360

(22) PCT Filed: Jul. 6, 1998

(86) PCT No.: PCT/EP98/04155

§ 371 Date: Jan. 7, 2000

§ 102(e) Date: Jan. 7, 2000

(87) PCT Pub. No.: WO99/02978

PCT Pub. Date: Jan. 21, 1999

(30) Foreign Application Priority Data

Jul. 7, 1997 (EP) ................................................ 97111450

(51) Int. Cl.[7] ..................................................... B01J 19/08

(52) U.S. Cl. ................ 204/164; 422/186.05; 422/186.06

(58) Field of Search ....................... 204/164; 422/186.05, 422/186, 186.06

(56) References Cited

U.S. PATENT DOCUMENTS

| | | |
|---|---|---|
| 3,732,056 | 5/1973 | Eddy et al. . |
| 5,340,553 | 8/1994 | Huffman . |

FOREIGN PATENT DOCUMENTS

| | | |
|---|---|---|
| 553 791 | 8/1993 | (EP) . |
| 56-12430 | 2/1981 | (JP) . |
| 7-254265 | 10/1995 | (JP) . |

*Primary Examiner*—K. Mayekar
(74) *Attorney, Agent, or Firm*—Sughrue Mion, PLLC

(57) ABSTRACT

The present invention concerns a method for producing a controlled atmosphere having an oxygen partial pressure of below $10^{-13}$ Pa and an operating temperature above 1000° C. According to the invention a furnace is vented by a gas mixture having an oxygen partial pressure lower than $10^{-8}$ Pa but higher than that of said controlled atmosphere, and that a partial volume of said furnace is submitted to a static electric field having a strength of at least 6V/cm and reducing the oxygen partial pressure in this partial volume by orders of magnitude. The invention also relates to a device for implementing this method.

10 Claims, 1 Drawing Sheet

METHOD AND DEVICE FOR PRODUCING A CONTROLLED ATMOSPHERE WITH LOW OXYGEN PARTIAL PRESSURE

This application is a 35 U.S.C. 371 National Stage filing of PCT/EP98/04155, filed Jul. 6, 1998.

BACKGROUND OF THE INVENTION

1. Field of the Invention

The invention concerns a method for producing a controlled atmosphere having an oxygen partial pressure of below $10^{-13}$ Pa and an operating temperature above 1000° C. The invention also refers to a device for implementing this method.

2. Description of Related Art

An atmosphere having a low oxygen partial pressure and high temperature is often requested for studies relating to the corrosion behaviour of advanced materials. Thus, in the frame of coal gasification, which takes place at temperatures between 1200°C. and 1400° C., the refractory lining of the coal gasifier is in contact with gases such as CO, $CO_2$, $H_2S$, $H_2$, COS, ammonia at very low oxygen partial pressure. In most of today's industrial coal gasifiers the oxygen partial pressure lies below $10^{-10}$ Pa. The evaluation of the corrosion behaviour of such materials in a laboratory requires gas mixtures in which the partial pressures of the most important components such as oxygen ($p_{o2}$) and sulphur ($p_{s2}$) should be adapted to the real conditions of an industrial coal gasifier. It is particularly difficult to ensure in the laboratory an oxygen partial pressure which corresponds to that in a coal gasifier particularly if the oxygen partial pressure lies below $10^{-13}$ Pa. This is due to the fact that the other components of the gas mixture are seldom available free of oxygen impurities and that neither the admission duct for the mixture to the furnace nor the furnace itself is free of oxygen. In fact, there exist components in the furnace made for example of aluminium oxide which release oxygen at high temperature.

A possible solution to this problem for obtaining a defined atmosphere having a very low oxygen partial pressure is to conceive special furnaces with a graphite lining. However, this solution has certain drawbacks:

1. A special furnace is required for tests under a very low oxygen partial pressure (high investment).

2. Such graphite furnaces must exclusively be used for tests under extremely low oxygen partial pressures, as otherwise the graphite lining will oxidise.

From U.S. Pat. No. 3,732,056 an apparatus is known for hot pressing of oxide ceramics in a controlled oxygen atmosphere. This apparatus intends to increase the oxygen content in the furnace for oxidizing the ceramic material and not to reduce the oxygen content in a gas mixture to values which could not be achieved according to the state of the art.

The state of the art may be found in U.S. Pat. No. 5,340,553 since the method disclosed in this document concerns the removal of oxygen from a controlled atmosphere. This is achieved by a silicon material which is heated in a furnace up to about 1000° C. and acts as a getter which absorbs oxygen. However, no final partial oxygen pressure values are disclosed in this document.

SUMMARY OF THE INVENTION

The method according to the invention avoids the above quoted drawbacks and allows to create a defined atmosphere of gas mixtures with an oxygen partial pressure as low as $10^{-18}$ Pa.

BRIEF DESCRIPTION OF THE DRAWINGS

The invention will now be described in greater detail by means of preferred embodiments and the attached drawings.

DETAILED DESCRIPTION OF INVENTION

The main idea of the invention is to create by a local electric field an inhomogeneous oxygen distribution in the furnace, thus defining a partial volume inside the furnace, which presents an oxygen partial pressure far below that of the remaining volume of the furnace.

Figure 1:
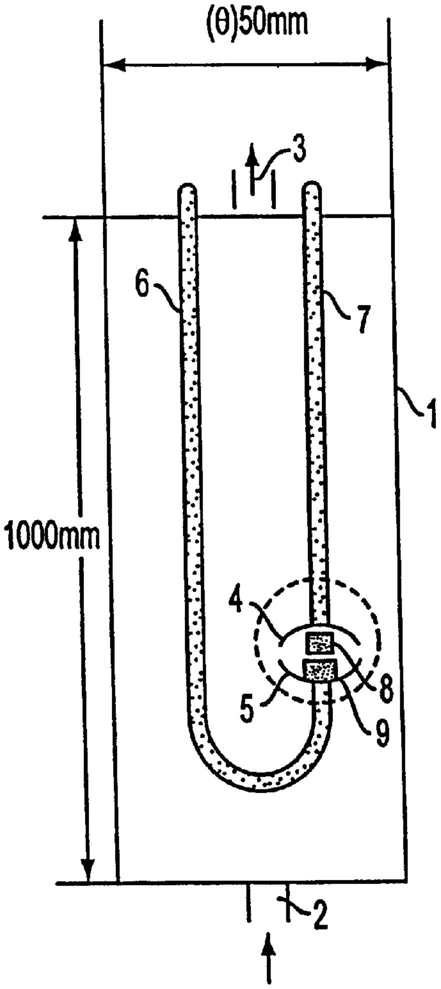
FIG. 1 shows schematically a device according to the invention.
Figure 2:
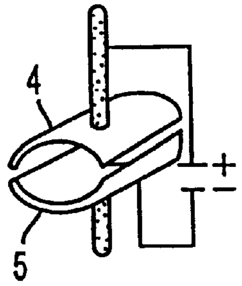
FIG. 2 shows at an enlarged scale a detail of the device of FIG. 1.

In FIG. 1, a cylindrical furnace is shown, whose heat generation and insulation means have not been shown, since these means are classical. The firnace comprises a cylindrical enclosure 1 having at one end a gas inlet 2 and at the opposite end a gas outlet 3. Two electrodes 4 and 5 are disposed one in front of the other inside the enclosure and are connected via heat-resistant conductors 6 and 7, made for example of SiC, to a DC source (not shown) which is disposed outside the furnace. As can be seen in FIG. 2 in more detail, the electrodes are shell-shaped, the concave surfaces facing each other. FIG. 1 further shows a sample 8 between the two electrodes, this sample being supported by a sample holder 9 made of an electrically insulating ceramic material.

The dimension of the main surface of the electrodes is selected at least 1.5 times as large as the corresponding dimension of the required partial volume of reduced oxygen partial pressure which is located in the central area between the two electrodes.

The operation of this device is as follows:

It is assumed that the furnace ensures the required high temperature of above 1000° C. to the inner volume of the enclosure 1. A sample 8 whose corrosion behaviour is to be studied in the presence of a given gas atmosphere is placed on the sample holder 9. The gas mixture injected through the inlet 2 differs from this defined atmosphere by the fact that its oxygen partial pressure is by orders of magnitude higher than the requested value. For example, the oxygen partial pressure at the inlet amounts to $10^{-11}$ Pa, whereas the required value in the partial volume between the electrodes 4 and 5 amounts to $10^{-18}$ Pa. By applying an electric DC field for example between 6 and 40 V/cm to the electrodes 4 and 5 through the conductors 6 and 7, the oxygen content in the partial volume between the electrodes 4 and 5 is lowered with respect to the remaining volume of the enclosure 1 by orders of magnitude, thus ensuring the required defined atmosphere in the small partial volume between the electrodes in order to study the behaviour of the sample 8 in this atmosphere.

Due to the invention, no special attention needs to be paid to the oxygen pollution of the furnace or of the gas admission ducts. Supplying a gas mixture whose oxygen partial pressure amounts to about $10^{-8}$ Pa does not present problems to a person skilled in this art.

In the frame of the invention, the electrodes may be shaped differently as long as they ensure a sufficiently high electric field for the entire partial volume necessary for the sample. The polarity of the electric field is of no importance as well as the direction of this field. In an alternate embodiment, this direction could be perpendicular to the one shown in FIGS. 1 and 2. It is useful to select the conductors 6 and 7 among the materials resisting the high temperatures involved in the furnace. As an example, silicon carbide SiC would be convenient.

The efficiency of the device according to the invention can be demonstrated by using samples which, when submitted to a gas mixture containing $H_2S$, show a physical or chemical modification as a function of the oxygen partial pressure. Such a substance is for example yttrium.

At high temperatures and in an air atmosphere (high oxygen partial pressure), yttrium oxide $Y_2O_3$ is built up. In an atmosphere of a coal gasifier, yttrium oxide is not stable due to the low oxygen partial pressure and transforms into either $Y_2O_2S$ (at oxygen partial pressures down to about $10^{-17}$ Pa) or $Y_2S_3$ (at an oxygen partial pressure below $10^{-18}$ Pa).

Applied to the device according to the invention, three tests can be made:

1. A dry gas mixture having 0.4 vol. % $H_2S$ is applied at 1200° C. to the device in which the sample is made of oxysulphide $Y_2O_2S$. The thermodynamic stability of this oxide can only be explained by the pollution of the test gas mixture with at least 2 ppm oxygen and 5 ppm humidity.

2. Now, if 0.7 vol. % hydrogen of the first mentioned mixture is replaced by water (wet gas mixture), the oxygen partial pressure at 1200° C. increases by six orders of magnitude. Yttrium is still converted into $Y_2O_2S$.

3. Finally, the electric field is applied and the wet gas mixture is supplied to the inlet 2 of the device. In this case, the yttrium sample is converted after a treatment of several hours into $Y_2S_3$. This demonstrates that the oxygen partial pressure in the partial volume must have been below $10^{-18}$ Pa, whereas this pressure outside this partial volume in the enclosure 1 amounted to about $10^{-11}$ Pa.

Figure 3:
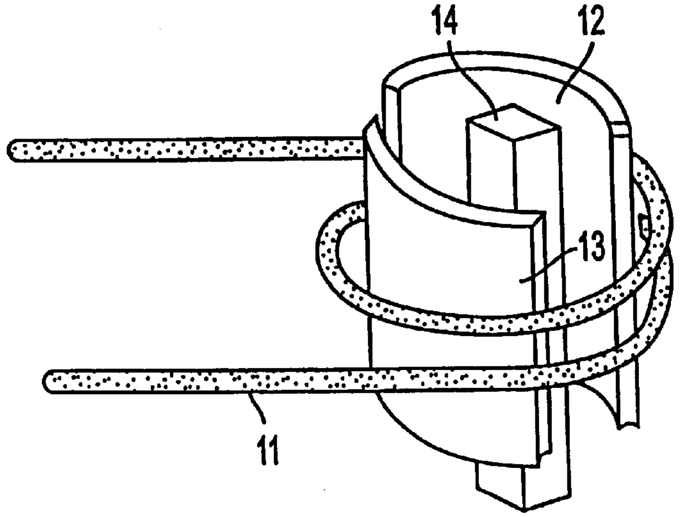
FIG. 3 shows schematically a second device according to the invention.

FIG. 3 shows an alternate embodiment of the device according to the invention. In this case, the furnace is of the induction type and comprises an induction coil and two shell-shaped susceptors 12 and 13. These susceptors are made from an electrically conductive material in which the high frequency field of the coil creates eddy currents and hence thermal energy. Between the two susceptors 12 and 13, a centrally located body 14 is disposed, which is made from a material with an electrical conductivity lower than that of the susceptors. This body 14 can be made from a ceramic material and can constitute simultaneously the sample which is to be submitted to the effect of the defined atmosphere having a very low oxygen partial pressure. Due to this conductivity of the body, eddy currents are not only induced in the susceptors, but also to a lower extent in the body 14. This difference in conductivity results in an electrical DC potential difference between the susceptors and the body 14, and this potential difference creates the electric field in the interspace between the sample 14 and the susceptors 12 and 13, thereby reducing the oxygen partial pressure in this area by several orders of magnitude.

Comparison tests have shown that the desired reduction of the oxygen partial pressure did not occur when the body was made of an insulating ceramic material such as calcium oxide which confirms the physical phenomenon cited above.

Of course, the invention is not restricted to the application of simulating coal gasification furnace conditions. The invention can be applied to any process requiring highly reducing conditions. In the field of fuel synthesis from the gaseous phase for example, pollution by $H_2O$, $O_2$ and $CO_2$ are very undesirable, because they degrade the efficiency of the synthesis.

The two embodiments which have been described are laboratory scaled realisations. Of course, the dimension of the partial volume in which the reduced oxygen partial pressure is present, must be adapted to the dimensions of the samples or to the process to be performed in such an environment.

What is claimed is:

1. A method for producing a controlled atmosphere having an oxygen partial pressure of below $10^{-13}$ Pa and an operating temperature above 1000° C., comprising the following steps:

venting a furnace by a gas mixture having an oxygen partial pressure lower than $10^{-8}$ Pa but higher than that of said controlled atmosphere, and submitting a partial volume of said furnace to a static electric field having a strength of at least 6 V/cm thereby reducing the oxygen partial pressure in this partial volume by orders of magnitude.

2. A device for producing a controlled atmosphere having an oxygen partial pressure of below $10^{-13}$ Pa and an operating temperature above 1000° C., comprising a furnace with inlets (2) and outlets (3) intended to vent said furnace with a gas mixture having an oxygen partial pressure lower than $10^{-8}$ Pa but higher than that of said controlled atmosphere, wherein two electrodes (4, 5) connected to a DC source are disposed inside said furnace to reduce the oxygen partial pressure in a partial volume of said furnace defined there-between.

3. A device according to claim 2, wherein the DC source is situated outside the furnace, and the electrodes (4, 5) are connected thereto via conductors (6, 7) made of SiC (silicon carbide).

4. A device according to claim 2, wherein the electrodes are plates facing each other and define said partial volume in the plate interspace.

5. A device according to claim 4, wherein the plates are shell-shaped, the concave sides facing each other.

6. A device according to claim 2, wherein the plates' main surface dimension is selected to be at least 1.5 times as large as the corresponding dimension of the required partial volume of said controlled atmosphere.

7. A device for producing a controlled atmosphere having an oxygen partial pressure of below $10^{-13}$ Pa and an operating temperature above 1000° C., comprising a furnace with inlets (2) and outlets (3) for venting said furnace with a gas mixture having an oxygen partial pressure lower than $10^{-8}$ Pa but higher than that of said controlled atmosphere, wherein the furnace contains a high frequency induction coil connected to a high frequency source, two shell-shaped susceptors (12, 13) having a high electrical conductivity and surrounding a partial volume of said furnace, and a body (14) disposed therebetween and made of a material having a reduced electrical conductivity with respect to the susceptors.

8. A device according to claim 7 wherein said body (14) is made of hot-pressed silicon nitride.

9. A device according to claim 7, wherein said body (14) is made of silicon carbide charged with silicon (SiSiC).

10. A system for producing a controlled atmosphere having an oxygen partial pressure of below $10^{-13}$ Pa and an operating temperature above 1000° C., comprising a furnace with inlets (2) and outlets (3) for venting said furnace with a gas mixture having an oxygen partial pressure lower than $10^{31\ 8}$ Pa but higher than said controlled atmosphere, wherein the furnace contains a high frequency induction coil connected to a high frequency source, two shell-shaped susceptors (12, 13) having a high electrical conductivity and surrounding a partial volume of said furnace, and, disposed therebetween, a sample (14) to be submitted to this controlled atmosphere and made of a material having a reduced electrical conductivity with respect to the susceptors.

* * * * *